US011255276B2

(12) United States Patent
Cohn et al.

(10) Patent No.: US 11,255,276 B2
(45) Date of Patent: Feb. 22, 2022

(54) UPSPEEDED OPERATION OF ALCOHOL-ENABLED GASOLINE ENGINES

(71) Applicant: Massachusetts Institute Of Technology, Cambridge, MA (US)

(72) Inventors: Daniel R. Cohn, Cambridge, MA (US); Leslie Bromberg, Sharon, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/753,889

(22) PCT Filed: Sep. 24, 2018

(86) PCT No.: PCT/US2018/052382
§ 371 (c)(1),
(2) Date: Apr. 6, 2020

(87) PCT Pub. No.: WO2019/079000
PCT Pub. Date: Apr. 25, 2019

(65) Prior Publication Data
US 2020/0362775 A1    Nov. 19, 2020

Related U.S. Application Data

(60) Provisional application No. 62/572,701, filed on Oct. 16, 2017.

(51) Int. Cl.
*F02D 19/06* (2006.01)
*B60W 10/06* (2006.01)
(Continued)

(52) U.S. Cl.
CPC ............ *F02D 19/0615* (2013.01); *B60K 6/24* (2013.01); *B60K 6/46* (2013.01); *B60W 10/06* (2013.01);
(Continued)

(58) Field of Classification Search
CPC .. F02D 19/0615; F02D 15/00; F02D 19/0655; F02D 19/08; F02D 19/12;
(Continued)

(56) References Cited

U.S. PATENT DOCUMENTS 7,121,234 B2    10/2006  Schmitz et al.
7,159,568 B1 *   1/2007  Lewis ................. F02D 19/0692
                                                       123/431
(Continued)

FOREIGN PATENT DOCUMENTS

WO    2013/101282 A2    7/2013

OTHER PUBLICATIONS

International Search Report and Written Opinion dated Jan. 22, 2019 in corresponding PCT application No. PCT/US2018/052382.
(Continued)

*Primary Examiner* — Sherry L Estremsky
(74) *Attorney, Agent, or Firm* — Nields, Lemack & Frame, LLC

(57) ABSTRACT

Spark ignition engine operation at higher RPM so as to reduce alcohol requirements in high efficiency alcohol enhanced gasoline engines is disclosed. Control of engine upspeeding (use of a higher ratio of engine RPM to wheel RPM) so as to achieve an alcohol reduction objective while limiting any decrease in efficiency is described. High RPM alcohol enhanced gasoline engine operation in plug-in series hybrid powertrains for heavy duty trucks and other vehicles is also described.

15 Claims, 7 Drawing Sheets

(51) Int. Cl.
| | |
|---|---|
| B60W 10/10 | (2012.01) |
| B60K 6/24 | (2007.10) |
| B60K 6/46 | (2007.10) |
| B60W 10/08 | (2006.01) |
| B60W 10/26 | (2006.01) |
| B60W 30/188 | (2012.01) |
| F02B 19/12 | (2006.01) |
| F02D 15/00 | (2006.01) |
| F02D 19/08 | (2006.01) |
| F02D 19/12 | (2006.01) |
| F02D 29/02 | (2006.01) |
| F02D 41/00 | (2006.01) |
| F02M 25/025 | (2006.01) |
| F02N 11/08 | (2006.01) |

(52) U.S. Cl.
CPC ............ *B60W 10/08* (2013.01); *B60W 10/10* (2013.01); *B60W 10/26* (2013.01); *B60W 30/188* (2013.01); *F02B 19/12* (2013.01); *F02D 15/00* (2013.01); *F02D 19/0655* (2013.01); *F02D 19/08* (2013.01); *F02D 19/12* (2013.01); *F02D 29/02* (2013.01); *F02D 41/0025* (2013.01); *F02M 25/025* (2013.01); *F02N 11/0862* (2013.01); *B60W 2510/0638* (2013.01); *B60W 2510/0666* (2013.01); *B60W 2510/08* (2013.01); *B60W 2520/28* (2013.01); *B60W 2710/06* (2013.01); *B60W 2710/0616* (2013.01); *B60W 2710/0644* (2013.01); *B60W 2710/0677* (2013.01); *B60W 2710/1005* (2013.01); *B60W 2710/242* (2013.01); *B60Y 2200/92* (2013.01)

(58) Field of Classification Search
CPC ....... F02D 29/02; F02D 41/0025; B60K 6/24; B60K 6/46; B60W 10/06; B60W 10/08; B60W 10/10; B60W 10/26; B60W 30/188; B60W 2510/0638; B60W 2510/0666; B60W 2510/08; B60W 2520/28; B60W 2710/06; B60W 2710/0616; B60W 2710/0644; B60W 2710/0677; B60W 2710/1005; B60W 2710/242; F02B 19/12; F02M 25/025; F02N 11/0862; B60Y 2200/92
See application file for complete search history.

(56) References Cited

U.S. PATENT DOCUMENTS

| | | | |
|---|---|---|---|
| 7,314,033 B2 | 1/2008 | Cohn et al. | |
| 7,320,302 B2 | 1/2008 | Kobayashi | |
| 7,497,198 B2* | 3/2009 | Leone | F02D 29/02 123/295 |
| 7,647,994 B1* | 1/2010 | Belloso | B60L 50/61 180/65.31 |
| 7,730,872 B2* | 6/2010 | Leone | F02B 47/02 123/305 |
| 7,806,095 B2 | 10/2010 | Cook et al. | |
| 8,276,565 B2 | 10/2012 | Cohn et al. | |
| 8,353,269 B2 | 1/2013 | Kasseris et al. | |
| 8,522,758 B2* | 9/2013 | Bromberg | F02B 17/005 123/577 |
| 8,967,089 B2 | 3/2015 | Morgenstern et al. | |
| 9,234,482 B2 | 1/2016 | Bromberg et al. | |
| 9,273,618 B2 | 3/2016 | Bromberg et al. | |
| 9,458,761 B2* | 10/2016 | Guinther | C10L 1/223 |
| 10,267,210 B2* | 4/2019 | Villegas Muriel | F01P 3/12 |
| 2007/0007056 A1 | 1/2007 | Bowers et al. | |
| 2009/0321158 A1 | 12/2009 | Glonner et al. | |
| 2010/0121559 A1* | 5/2010 | Bromberg | F02D 19/084 701/111 |
| 2011/0114058 A1* | 5/2011 | Cohn | F02D 19/0655 123/25 A |
| 2017/0074184 A1 | 3/2017 | Kim | |

OTHER PUBLICATIONS

Anderson et al., "High Octane Number Ethanol-Gasoline Blends: Quantifying the Potential Benefits in the United States", Fuel, vol. 97, pp. 585-594, 2012.
Anderson et al., "Octane Numbers of Ethanol- and Methanol-Gasoline Blends Estimated from Molar Concentrations", Energy Fuels, vol. 24, pp. 6576-6585, 2010.
BorgWarner, "Turbocharger for an Exhaust Temperature of 1050° C.", http://www.turbos.bwauto.com/products/turbochargerExhaustTemperature.aspx, 2017.
Brandt et al., "Methane Leaks from North American Natural Gas Systems", Science, vol. 343, pp. 733-735, Feb. 2014.
Bromberg et al., "Estimates of DI Hydrous Ethanol Utilization for Knock Avoidance and Comparison to a Measured and Simulated DI E85 Baseline", MIT Plasma Science and Fusion Center, Sep. 2009.
Cohn et al., "Direct Injection Ethanol Boosted Gasoline Engines: Biofuel Leveraging for Cost Effective Reduction of Oil Dependence and CO2 Emissions", Apr. 2005.
ARV-10-044 Final Report, Alternative and Renewable Fuel and Vehicle Technology Program, Cummins Inc., Aug. 2014.
Flugge et al., "A Life-Cycle Analysis of the Greenhouse Gas Emissions of Corn-Based Ethanol", ICF, Jan. 2017.
E85 Optimized Engine End of Project Technical Report, Ford Motor Company, Mar. 2012.
Gardner, "The Outlook to Energy: A View to 2040", Exxon Mobil, Sep. 2016.
Jo et al., "Optimal Use of Ethanol in Dual Fuel Applications: Effects of Engine Downsizing, Spark Retard, and Compression Ratio on Fuel Economy", SAE International Journal of Engines, vol. 9, Iss. 2, pp. 1087-1101, Jun. 2016.
Matsumoto et al., "Development of Compact and High-performance Turbocharger for 1,050° C. Exhaust Gas", Mitsubishi Heavy Industries Technical Review vol. 45, No. 3, Sep. 2008.
McGee et al., "The Effects of Port Fuel Injection Timing and Targeting on Fuel Preparation Relative to a Pre-Vaporized System", SAE Technical Paper Series, Oct. 2000.
Muttitt, "ExxonMobil's Outlook for Energy: Forecast or Fantasy?", Oil Change International, Dec. 2014.
Reinhart et al., "An Efficient, Durable Vocational Truck Gasoline Engine", SAE International Journal of Engines, vol. 9, Iss. 3, Sep. 2016.
Stein et al., "An Overview of the Effects of Ethanol-Gasoline Blends on SI Engine Performance, Fuel Efficiency, and Emissions", SAE International Journal of Engines, vol. 6, Iss. 1, May 2013.

* cited by examiner

UPSPEEDED OPERATION OF ALCOHOL-ENABLED GASOLINE ENGINES

This application claims priority to U.S. Provisional Patent Application Ser. No. 62/572,701, filed Oct. 16, 2017, the disclosure of which is incorporated herein by reference in its entirety.

BACKGROUND OF THE INVENTION

The world's heavy and medium duty vehicles are the largest source of worldwide air pollution in the transportation sector. These vehicles are almost entirely powered by diesel engines. With increasing concerns about the adverse air quality impacts of these diesel engines, as well as from light duty diesel vehicles, there is a need for a much cleaner alternative using room temperature liquid fuels.

Spark ignition (SI) alcohol enhanced gasoline engines, powered by gasoline-alcohol (ethanol or methanol) mixtures, can address these needs. These engines can provide energy-based high efficiencies comparable to diesel engine, while also reducing nitrogen oxide (NOx) emissions by around 90% relative to cleanest diesel engines that use complex and expensive state of the art aftertreatment.

This emissions reduction is obtained by using a stoichiometric fuel/air ratio which enables use of the highly effective 3 way catalyst for exhaust aftertreatment. This large NOx reduction has been demonstrated in SI medium and heavy duty natural gas engines using stoichiometric operation.

The diesel-like high efficiency can be provided by SI alcohol enhanced gasoline operation in turbocharged engines that are smaller than the diesel engines while producing the same power and/or torque, thereby reducing the efficiency losses from frictional losses; and from use of a higher compression ratio than is typically used in SI engines. The operation of these downsized engines is enabled by using alcohol to provide a constant or varying fraction of the total gasoline-alcohol fueling that is sufficient to prevent knock that would otherwise occur at high torque. Dual fuel operation, using separate injection systems for fuel from a main tank and fuel from a secondary tank, is used to provide varying ratios of alcohol and gasoline during a driving period.

It is desirable for these engines to be able to operate with drive cycle fueling ranging from mainly gasoline with only a small amount of alcohol to 100% alcohol. However, in some cases, such as long haul heavy duty truck operation where high torque operation is used during most of a driving period, the minimum fraction of alcohol that is required can be higher than that which would cause an unattractive fuel cost or inconvenience in alcohol refueling.

Upspeeding can be used as option to reduce the alcohol requirement by allowing lower torque operation in the engine. The basic concept has been previously described. Upspeeding uses gearing to increase the ratio of SI engine RPM to wheel RPM relative to what it would ordinarily be at a given level of engine and wheel power and a given level of wheel torque. The increase in engine RPM makes it possible to operate the engine with a lower engine torque for a given power and for a given torque provided by the wheels. Operation at lower engine torque reduces the alcohol fraction of total fuel that is needed to prevent knock.

However, upspeeding may decrease efficiency. Therefore, it would be beneficial if there were means to optimize the use of upspeeding to reduce alcohol consumption while minimizing any decrease in efficiency. Further, it would be advantageous if there were a system to adjust the upspeeding so as to meet various operator objectives. Additionally, it would be beneficial if there were a system to reduce adverse effects on vehicle response that would otherwise occur.

SUMMARY OF THE INVENTION

The present invention generally relates to a system for optimizing the use of upspeeding and higher engine RPM to reduce alcohol consumption in alcohol enhanced gasoline engines while minimizing any decrease in efficiency, and means to adjust the upspeeding so as to meet various operator objectives. It also describes techniques to reduce adverse effects on vehicle response that would otherwise occur when upspeeding and high RPM operation are used. The use of alcohol-enabled higher efficiency gasoline engines operated at high RPM in combination with electrical propulsion, including use in series hybrid powertrains, is also disclosed.

BRIEF DESCRIPTION OF THE DRAWINGS

For a better understanding of the present disclosure, reference is made to the accompanying drawings, in which like elements are referenced with like numerals, and in which:

FIG. 3A shows a lengthened response time as torque and engine speed are changed; the change in engine speed lengthens the response time, while limiting alcohol requirement. FIG. 3B shows a path having a shorter response time, with more ethanol consumption during the transient because of higher torque operation with increased ethanol requirement.

DETAILED DESCRIPTION

Gasoline Engine Downsizing Using Gasoline-Alcohol Mixtures

Figure 1:
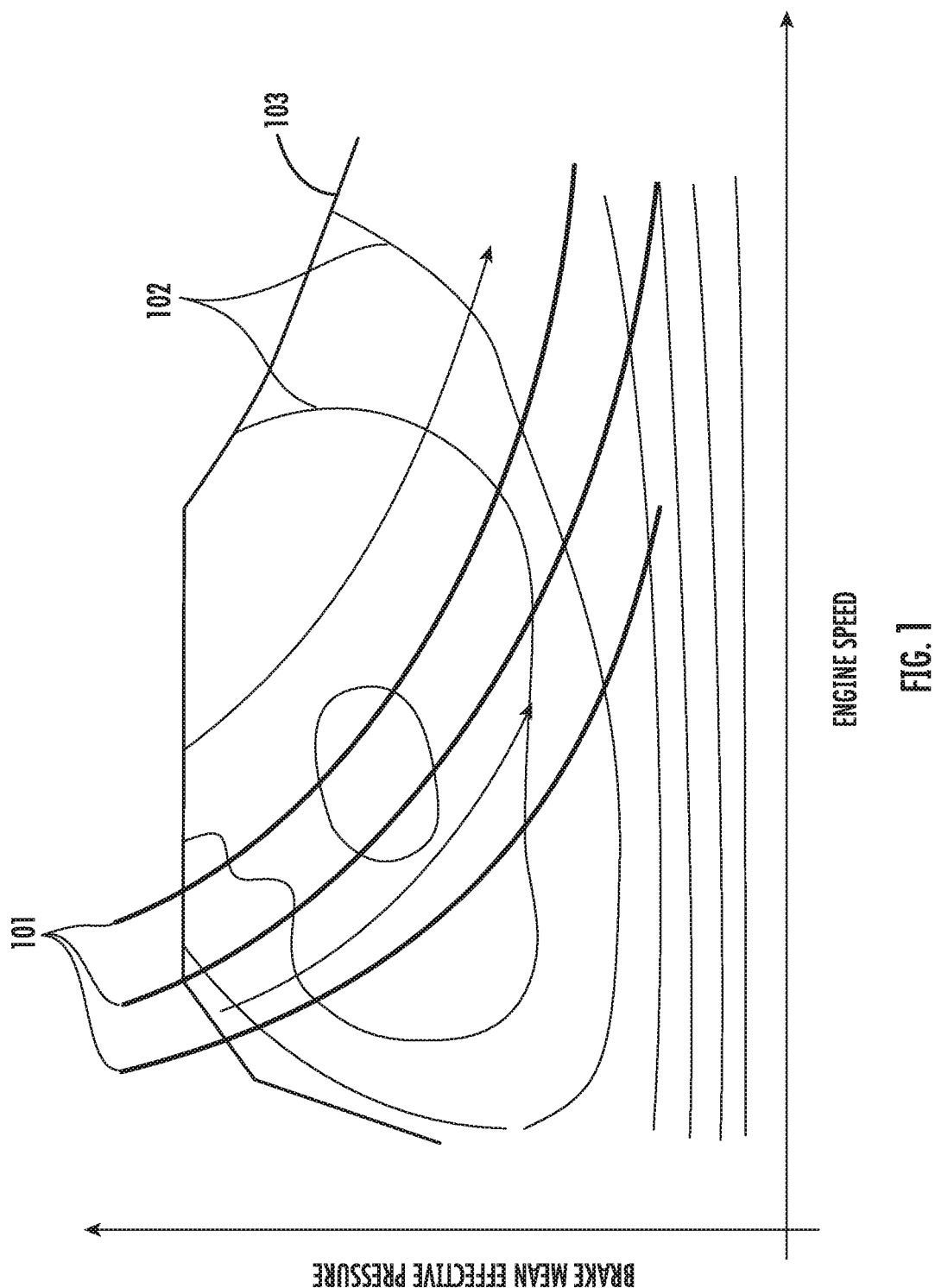
FIG. 1 is an illustrative engine map showing contours of constant efficiency, constant power and an upspeeding shift of operating points (shown by black arrows) in order to minimize ethanol (or methanol) fuel consumption.

Diesel engines have been more efficient than Spark Ignition (SI) gasoline engines due to their operation with dilute mixtures of fuel and air and/or engine gas recirculation (EGR) and higher compression ratio. More than 70% of this efficiency gap can generally be closed by use of a SI gasoline engine which is substantially smaller (smaller total engine cylinder volume) than the diesel engine. The reduction of the gasoline engine size relative to the diesel engine size can be enabled by taking full advantage of the capability of gasoline engines to operate at higher Brake Mean Effective Pressure (BMEP) than the diesel engine. BMEP is equal to torque per cylinder volume. The capability for high BMEP operation is a result of the stoichiometric fuel/air ratio operation of gasoline engines. Its full advantage is made possible by the alcohol enabled removal of the knock limit on the pressure boosting of engines by turbocharging or supercharging.

The higher BMEP operation allows engine downsizing by around a factor of two relative to a diesel engine, resulting in an increase in efficiency. Downsizing is the reduction in total engine cylinder volume needed for a certain level of vehicle performance. Engine power can provide a very useful performance measure since it determines both the power delivered to the wheels and with appropriate gearing, it determines the torque delivered by the wheels. By delivering the same power and torque to the wheels with a smaller engine, the ratio of engine power losses (from pumping of air into the engine and from other friction sources) to power delivered by the engine to the wheels can be reduced, thereby increasing efficiency.

Increasing the compression ratio of the spark ignition gasoline engine from its typical value of 10 to the 12 to 14 range, which is made possible by alcohol enabled increased knock suppression, provides a further efficiency gain which enables the attainment of a comparable efficiency to a diesel engine.

The amount of downsizing in a gasoline fueled engine is limited by the occurrence of knock which occurs at high temperature and pressures that result from turbocharging. Present turbocharged direct injection gasoline engines use the vaporization cooling from direct injection to increase knock resistance, thereby facilitating downsizing by allowing higher knock-free pressure in the engine from the turbocharging. Knock is undesired self ignition which occurs within the cylinder.

Further downsizing can be obtained by increasing knock resistance by use of high octane alcohol fuels (ethanol, methanol) together with gasoline. Alcohol fuels can also provide additional knock resistance by vaporization cooling from fuel which is introduced so as to vaporize inside the engine cylinders rather than in the manifold as is the case with conventional closed valve port fuel injection. This provides a very high effective octane number (for example, greater than 120), which represents the combination of the knock resistance provided by the chemical and vaporization cooling knock resistance of the alcohol.

The higher octane fuel can be blended with the gasoline and used in a mixture where the alcohol fraction of the mixture is constant during a drive cycle.

Alternatively, a dual fuel system can be used where a varying alcohol fraction of total fuel is introduced into the engine cylinders from a second tank so as to prevent knock. In the dual fuel approach, gasoline or a low alcohol concentration mixture of alcohol with gasoline is introduced into the engine cylinders by a first fuel injection system; and a high alcohol concentration mixture of alcohol and gasoline, or a mixture of alcohol and water is introduced from a second fueling system in an amount needed to prevent knock. This approach can be referred to as "alcohol octane boosting".

Dual fuel operation also makes it possible to use alcohol-water mixtures or water alone since it is difficult to store these fluids in the same tank as gasoline without phase separation.

This dual fuel approach can provide a large reduction in the required amount of alcohol (such as more than an 80% reduction relative to the amount needed for a constant ratio alcohol/gasoline mixture) over a driving cycle where most of the driving is at low torque (such as light duty drive cycles, or a delivery truck drive cycle). For a drive cycle where most of the driving is at high torque (for example a long haul heavy duty truck drive cycle, or light vehicle towing), the reduction in drive cycle alcohol consumption could be substantially smaller (such as a 50% reduction).

The alcohol fraction requirement for knock prevention is zero up to a certain level of engine BMEP and then increases with increasing BMEP. BMEP is the dominant parameter in determining the increase in knock resistance that must be provided by the alcohol.

Upspeeding

Upspeeding, which is an increased ratio of engine RPM to wheel RPM relative to the ratio would ordinarily be used at a given power, can be used to decrease the engine torque and BMEP that is required for a given torque provided by the wheels. The reduction of BMEP at constant power with increased engine speed reduces the alcohol fraction of total fuel requirement that would otherwise be needed.

Upspeeding can more generally be viewed as a means to facilitate downsizing by reducing the knock suppression required for decreasing the engine size needed to provide a given level of torque at the wheels.

By taking full advantage of the reduced deterioration of efficiency at higher RPM that is starting to be available in light duty vehicle engines, reduction of the required BMEP and alcohol fraction can be employed over a wide range of upspeeding without an unacceptable decrease in efficiency. Moreover, this range of upspeeding can be expanded by approaches described in this disclosure.

The engine efficiency decline with increasing RPM and use of upspeeding would preferably be such that the utilization of upspeeding would reduce engine efficiency by less than 5% over a drive cycle, such as the UDDS or US06 drive cycle, and preferably by less than 3% while providing a reduction in the alcohol required for knock suppression by at least a factor of five.

The upspeeding ratio is the ratio of the increased RPM ratio relative the ratio that would ordinarily be used. The upspeeding ratio that is employed is achieved by the extra or changed gearing that is chosen to increase the engine speed for a given amount of angular speed at the wheels relative to what it would have been without upspeeding.

A rough value for the maximum level of upspeeding that can be employed is a factor of two; that is, the ratio of engine speed to wheel speed is increased by a factor of two compared to conventional operation. For example, a medium duty truck engine that generally operates around 1800 RPM would generally operate around 3600 RPM for an upspeeding level of two. The required BMEP and torque for an engine for a given amount of power varies inversely with the level of upspeeding.

FIG. 1 shows a typical state-of-the art engine map with constant power contours that have an inversely dependence of BMEP on RPM. Lines 101 represent constant power contours. Lines 102 represent fuel efficiency contours. At light load (low BMEP), the efficiency increases with BMEP. At higher loads, the efficiency is nearly independent of BMEP and can decline relatively slowly with increasing engine speed at high RPM in appropriately designed engines. As the operating points are pushed in the direction of the arrows, the alcohol consumption decreases with decreasing BMEP. Line 103 indicates maximum BMEP.

Upspeeding moves engine operation points downward on a contour of constant power toward use of greater engine speed. Contours of different levels of efficiency are also shown as lines 102.

For an engine that operates in a given power range (power difference between power contours) at given BMEP, upspeeding can used to move the power range to a lower BMEP; the values of the lowest speed and highest speed in the power range would both be increased.

Above a given critical torque (corresponding roughly to engine operation with unthrottled operation), the engine efficiency does not vary much with increasing torque, and has a weak dependence on engine speed. Present improvements in spark ignition engine combustion rates and breathing have substantially reduced the deterioration in efficiency with engine speed that had previously been encountered. Further improvements can further reduce this deterioration.

It is preferred that upspeeding be used to reduce required BMEP for a given torque delivered by the wheels by at least 25% and preferably by at least 40%.

The use of engine upspeeding can be facilitated by the increased deployment of transmissions system with a larger number of gears (e.g. six forward gears or more) or by the use of continuously variable transmission systems. An alternative approach is the use of what can be described as "under-drive capability", where an additional gear is introduced to provide the required flexibility.

Variable Upspeeding Control Alcohol Use-Efficiency Tradeoff

A control system for a dual fuel gasoline-alcohol engine is employed to change the level of upspeeding so as to reduce or minimize efficiency loss for a given reduction in alcohol consumption during a driving period.

In order to reduce or minimize efficiency loss, use of upspeeding is controlled so as to avoid its use at lower levels of BMEP where alcohol from the second tank in a dual fuel engine is not needed to prevent knock. The use of upspeeding would not provide any alcohol reduction benefit while having the disadvantage of decreasing efficiency through the pumping losses that occur at lower BMEP. Thus, it is advantageous for the control system to operate gearing so as not to use upspeeding when the BMEP is below a certain level. This level can be determined by the value of BMEP at which is necessary to use alcohol from the second fueling system in order to prevent knock.

More broadly, upspeeding is not employed when it is not needed to prevent knock that would otherwise occur.

Figure 2:
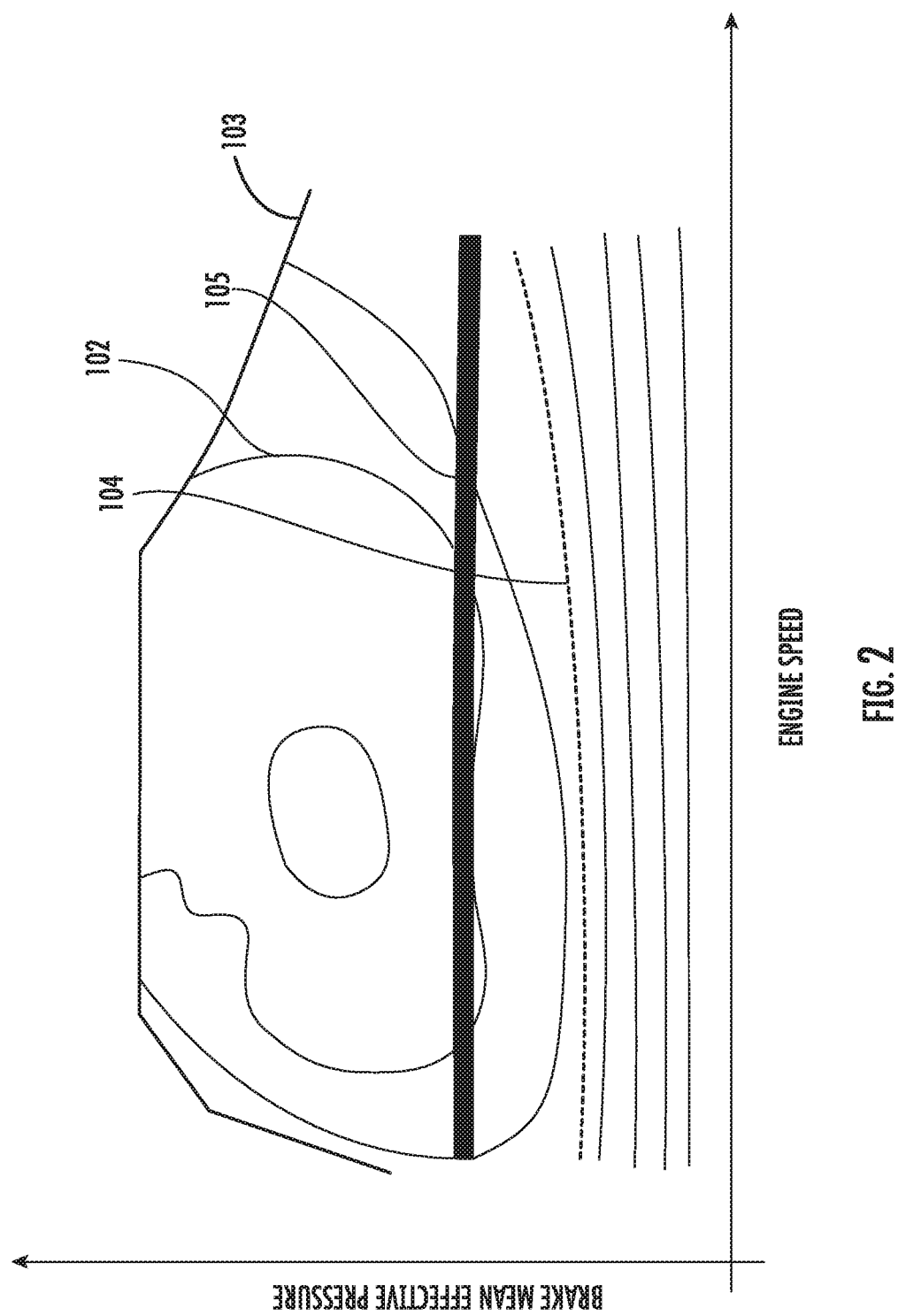
FIG. 2 is an engine map illustrating the boundary between the high efficiency region at high loads (high torque), and the low efficiency region at low loads (low levels of torque). Also shown is the maximum torque that is knock free without alcohol.

FIG. 2 shows the approximate boundary 104 in the engine map that separates the relatively constant engine efficiency region, which occurs at higher loads, from the rapidly deteriorating efficiency with decreasing BMEP at lower values of torque. It is preferred that the engine not be operated in these low torque regions. Use of upspeeding should be avoided in these regions. Avoidance of upspeeding in these regions enables operation at greater values of torque than would be the case if upspeeding was employed. It is preferred to operate at torque levels that are greater than boundary 104. Upspeeding would be controlled so as not to be used below a selected value of BMEP.

It is also preferred to operate at torque levels that are less than line 105, which represents the maximum torque allowed for knock free operation without alcohol.

When upspeeding is utilized, the level of upspeeding that is used can be limited so that when the BMEP decreases below a certain value, the level of upspeeding is reduced or upspeeding is eliminated. This level can be the value of BMEP where efficiency starts to drop rapidly with decreasing BMEP due to adverse effects of pumping losses on efficiency.

Figure 7:
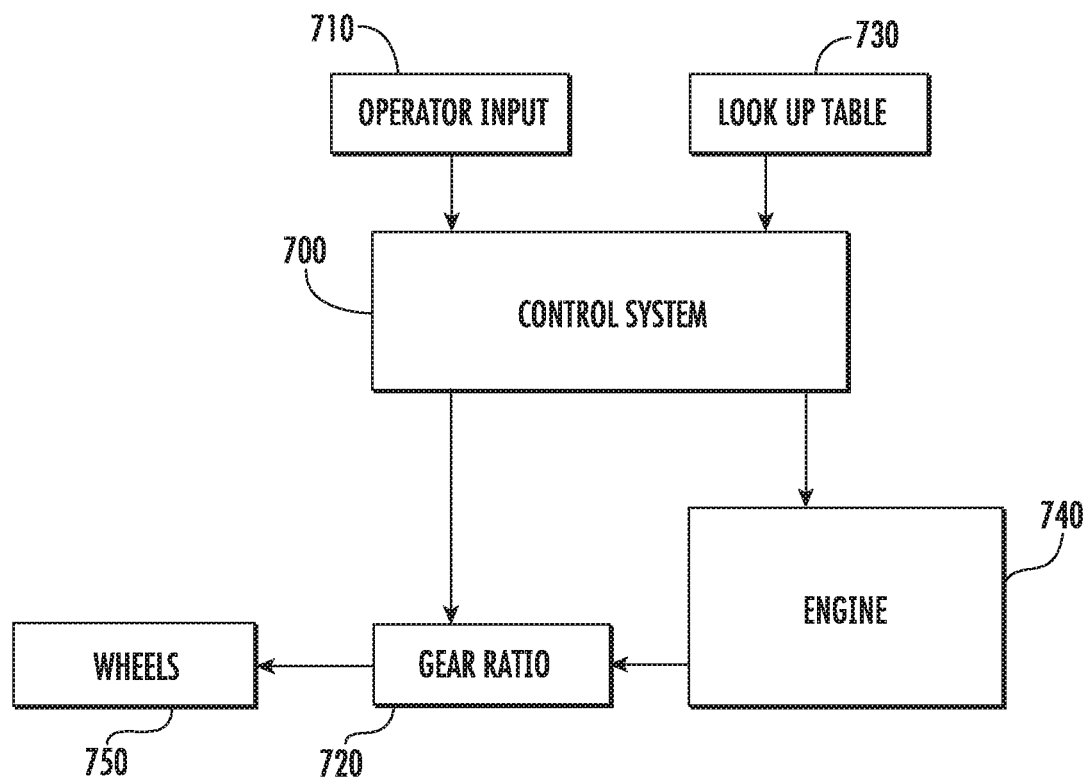
FIG. 7 shows a representative system where a control system controls the gear ratio and the amount of alcohol used in the engine based on various inputs.

FIG. 7 shows a representative system. The control system 700 allows the operator 710 to adjust the use of upspeeding so as to achieve a certain level of alcohol reduction during a driving period at the cost of a certain reduction in efficiency during a given driving period.

Once the level of upspeeding to be used over a driving period is set, the control system 700 would shift the gear ratio 720 to a higher value than the ratio of the non-upspeeded engine RPM to the RPM of the wheels 750 when a given level of BMEP (for example, the BMEP at which no alcohol is needed to prevent knock) and/or a given level power has been exceeded; and would return to the non-upspeeded gear ratio when the BMEP drops to the given level. The gear ratio 720 could also be changed at different values of BMEP. The change in upspeeding with BMEP could be optimized so as to reduce or minimize the amount of alcohol that is used.

The fraction of alcohol required for knock control in a representative high efficiency engine operated with a gasoline-alcohol fuel mixture decreases with decreasing BMEP and reaches zero at a BMEP that is in the range of one third to one half of the maximum BMEP. Consequently, if upspeeding can reduce the drive-cycle BMEP by a factor of two, the alcohol requirement over the drive cycle can be reduced by a large factor or possibly eliminated altogether. The reduction can be substantially more than a factor of two depending on the drive cycle. For drive cycles with much of the operation at low BMEP, the reduction of the drive cycle alcohol requirement would be substantially greater than two because the upspeeding would move this part of the engine operating region into a BMEP range where no alcohol is needed.

The control system 700 could use look up table information 730 about the fraction of alcohol required for knock control in the engine 740 under various conditions, such as BMEP. The information could be provided by computational models, dyno measurements and/or vehicle operation measurements. The control system 700 can use this information, in combination with information of the effect of upspeeding on the BMEP that is required for a various driving conditions and with information regarding the effect of upspeeding on efficiency to determine what upspeeding ratio should be employed for various objectives of alcohol reduction while limiting any decrease in efficiency.

The effect of upspeeding on a drive cycle alcohol requirement can be calculated by determining the alcohol fraction at each point in the engine map and combining this result with the change in the fraction of time that the engine spends at each point in the engine map when upspeeding is used. The fraction of time that the engine spends at each point in the engine map can be determined by information for a given standard drive cycle or from measurements of engine operation during a drive cycle which is of particular interest (which could be the driving time between gasoline refill) for a given fleet of vehicles or a given vehicle.

The loss in efficiency could also be determined for various levels of upspeeding.

Using this information, the operator 710 of the vehicle could choose the amount of upspeeding that is desired during a driving period. The operator can communicate his/her intention by pressing a switch (similar to today's "sport or ECO" mode or to the option on some gear shifts for downshifting for hill climbing), or by communicating orally, with a system in the car for understanding spoken language.

The operator 710 could inform the control system about the trip destination and time requirements, so that the control system 700 can adjust driving conditions to match the available alcohol and minimize the fuel consumption. In the case of self-driving or driving assist vehicles, the control system 700 will automatically, and without constant supervision from the operator 710, adjust the driving conditions to match the needs of the operator or passengers (i.e., comfort, speed, acceleration, estimated time of arrival). The operator 710 could use words such as "fast", "slow", "normal", "aggressive", or "scenic" to communicate the operator wishes to the control system.

In addition, the vehicle can use a self-learning process, using previous experience in the driving condition, using information from vehicle operator and topography (which could be acquired from a GPS). Thus, a fleet of vehicles that operate over relatively similar routes and schedules could "look forward" for the power requirements and automatically adjust the upspeeding to match the available alcohol. The operator 710 could also be informed of options to change driving habits that could reduce the alcohol consumption, over the expected drive cycle.

For example, for driving where there are limited alcohol refueling capabilities, the alcohol use could be set by the requirement that the alcohol be entirely or mainly provided by onboard separation from a low concentration alcohol-gasoline mixture such as E10 or M15. The alcohol use in this case would be less than roughly 8% of the gasoline use if ethanol were used and less than 12% if methanol were used.

For the case where onboard separation is not used and external fill of the second tank is employed, it may be desired that the external fill requirement be within a factor of one to three times of that for urea in a diesel engine exhaust treatment system. In this case, the alcohol consumption level would be set to be somewhere in the range of 3 to 10%. The alcohol could be provided by an additional pump at a service station island as is the case with the provision of urea for trucks.

Another possible mode of providing the required alcohol is to use a combination of onboard separation and external refill. Onboard separation of ethanol from E10 could provide an amount of ethanol that is 5 to 8% of the gasoline that is consumed over a drive cycle. If needed, more ethanol could be provided by external fill of the second tank.

In addition to setting the amount of upspeeding (the upspeeding ratio and time duration of upspeeding) to be used for or during a driving period, the upspeeding ratio could also be varied as a function of position in the engine map since less upspeeding is needed to bring the alcohol requirement to zero at lower values of BMEP. The upspeeding ratio could be determined by various torque levels in the engine.

With alcohol-enabled downsizing using turbocharging, the cycle efficiency increases by about 20-25% relative to a non-pressure boosted gasoline engine. Upspeeding could decrease the efficiency of highly-upspeeded points (high BMEP points) in the engine map by about 5% when a maximum upspeeding ratio of around 2 is used. The reduction of drive cycle (such as the UDDS or US06 drive cycle) efficiency from an upspeeded engine with an upspeeding level of 2 could be considerably lower than 5% since most of the driving is not done at the highly upspeeded region of the engine map.

The decline in efficiency with increasing RPM and the utilization of upspeeding would preferably be such that the upspeeding would reduce engine efficiency by less than 5% over a drive cycle, such as the UDDS or US06 drive cycle, and more preferably by less than 3%, while decreasing the alcohol use over the drive cycle by a factor of more than three.

The upspeeding ratio that would be used could also be determined by an operational parameter of a device for onboard separation of alcohol from a gasoline-alcohol mixture (for example, ethanol from E10 or methanol from M15). For example, when the onboard fuel separator conversion efficiency is low or has decreased, the engine operation mode could be changed from no upspeeding to the use of upspeeding; or if upspeeding is already in use, the level of upspeeding could be increased.

The upspeeding control used for reducing the alcohol consumption could also be employed when water from a second tank is used for knock suppression instead of or together with alcohol. The water could be supplied by condensation of water vapor from the exhaust. When sufficient water is not available, upspeeding could be deployed or increased to reduce or eliminate the need for water. The control of the use of upspeeding could be dependent on exhaust gas temperature and other parameters which depend on the capability to recover water from the exhaust system as well as from the amount of water or change in the amount of water in the second tank.

Utilization of variable compression ratio is an additional option for reducing alcohol consumption. It could be employed in a similar way to upspeeding. The operator could decide on a given alcohol consumption/efficiency tradeoff by selecting a given compression ratio using variable compression ratio engine technology. Reduction of the compression ratio from 14 to 12 could provide a substantial reduction in alcohol consumption with a relatively small reduction in efficiency (e.g less than 2%). Further reduction of the compression ratio to 10 could provide an addition reduction in the alcohol requirement with an efficiency decrease of around 5% relative to operation at a compression ratio of 14.

Use of an operator controlled preset in compression ratio for a drive cycle could be considerably simpler than an instantaneous change in compression ratio as a function of the knock prevention requirement.

Combinations of upspeeding and a change in compression ratio could be chosen to reduce or minimize the efficiency loss for achieving a given reduction in the alcohol requirement.

Spark retard can also be employed in combination with upspeeding so as to prevent the drive period alcohol use from exceeding a certain level.

The above approaches for reducing alcohol use; controlling the amount of the alcohol reduction and the associated reduction in efficiency; and preventing a lengthening of engine response time in upspeeded engines can also be utilized for the introduction of water into cylinder, when water is used for knock suppression in an engine that is fueled with gasoline and alcohol or with gasoline alone. In this embodiment, the second fueling system can be employed to provide water alone, rather than alcohol plus water or alcohol.

Cylinder Deactivation By Defueling

Relative to a diesel engine, a spark ignition engine can have a considerable disadvantage at light load, where there is a substantial need for throttling of the inlet manifold. Vacuum in the inlet manifold in a spark ignition engine is needed because of the use of a constant air/fuel ratio in stoichiometric operation. For vehicles that spend substantial time at or near idle, this can result in a substantial efficiency penalty. It can be especially pronounced for locomotives and other off-road equipment. It can also be important for low load operation in any engine that uses upspeeding since upspeeding results in lower BMEP operation at a given level of power.

Improved performance at these conditions can be achieved by the use of Displacement On Demand (DOD). For on-road vehicles, DOD is traditionally achieved through cylinder deactivation, which is accomplished using valve deactivation. It can be advantageous to have an inexpensive means of DOD that does not involve valve deactivation, especially for engine conversions (for example, from compression ignition to spark ignition operation). In those applications, it would be possible to achieve DOD without valve deactivation by using a simpler system which uses elimination of fueling in those cylinders that are to be deactivated (cylinder defueling). In de-fueled cylinders, the cylinder charge gets compressed and decompressed near adiabatically, without combustion.

Low temperatures reduce the heat transfer from the engine to the walls, decreasing efficiency loss. Under some circumstances, there is heat transfer from the engine to the cylinder charge in the deactivated cylinders, and small amount of power can be created in those cylinders, depending on the valve timing. The heated charge is expanded in the cylinder. For most engines, there is little or no power gain, because of low wall temperatures in the cylinder. When DOD is engaged, the operating cylinders operate at higher load, eliminating the need for throttling the intake. Cylinder de-fueling is attractive for engines with a large number of cylinders (for example more than 8 cylinders), such as those in locomotives, marine or power generation. It may also be used in vehicular applications. Prechambers can be incorporated in these engines with DOD by fueling control.

Because of the ease for implementing cylinder deactivation in this manner, it is possible to alternate the cylinders that are being deactivated (i.e., not fueled), similar to Dynamic Skip Fire, with the difference being that valves are not deactivated. Engine roughness for off road applications is not an issue, but can be addressed by smartly adjusting those cylinders that are operating, and by the use of a flywheel.

The enlarged expansion of the cylinders would be useful in the case of defueling for displacement on demand, to assure that the exhaust is at or near the external air pressure, to minimize any pumping requirements that would otherwise result in a loss in efficiency.

Cylinder deactivation by defueling or by variable valve operation can be used in upspeeded engines to reduce the BMEP at which efficiency starts to sharply decrease with deceasing BMEP due to throttling. The selected value of BMEP below which upspeeding should be avoided, as discussed above, can be reduced.

Control of Response Time in Upspeeded Engines

Without appropriate additional controls, upspeeded operation in a dual fuel gasoline-alcohol engine (or in a single tank, single fuel engine) could have the drawback of a slower response time. The slower response time is due to a more limited capability to increase torque in engines that use upspeeding. Changing torque provides a relatively fast response time compared to changing speed. When upspeeding is used, there is greater reliance on increasing engine speed resulting in a slower response time.

The need for an increased level of torque and increased alcohol use to meet a vehicle responsiveness requirement is greatest in the low RPM, high torque region of the engine map. For a power change in the high RPM, higher power region of the engine map, there would be less of a need since the engine would already be running at high speed.

This need for an increased level of torque can be enabled by a relatively short burst of alcohol injection to provide sufficient knock resistance for reaching the desired amount of power. Once this level of power is reached, upspeeding can be employed to move engine operating point to a lower BMEP, higher engine speed point on a constant power contour, thereby reducing the alcohol requirement at the new power level.

The short duration increase in power needs to be substantial fraction of the peak power of the engine in order to be effective, for example more than 20%. Having a rapid engine response time is generally more important for light duty vehicles than heavy duty vehicles.

As an alternative to or in addition to a rapid increase in engine torque that is enabled by short duration alcohol boosting, variable compression ratio operation could be used to lower the compression ratio and thus eliminate knock during the short period in which the short duration high torque operation occurs.

Another option for providing the need for a rapid engine response when increased power is called for could be limited electrical propulsion operation.

Use of variable compression ratio and/or limited electrical propulsion operation in an engine that uses variable upspeeding to reduce knock suppression requirements could also be employed in engines that use a single fuel (or a single fuel mixture such as a gasoline-alcohol mixture) as well as in a dual fuel engine.

Limited Alcohol Boosting in Upspeeded Engines

A short duration power boost in a dual fuel gasoline engine that uses upspeeding could be enabled by the use of a rapid octane boost from introduction of alcohol (or an alcohol-water mixture or water alone) provided by the separate tank fuel. This provides a higher knock resistance during the request for a rapid increase in power and enables increased torque instead of mainly relying on increasing speed. Upspeeded operation, where the need for increased power is provided by increasing speed, would be used for most of the operation time when gasoline alone is not sufficient to prevent knock.

The additional alcohol requirement for this limited use of alcohol boosting improved responsiveness would generally be relatively small because of its short duration and use only in the high torque, low speed region of the engine map in an engine that uses upspeeding.

Figure 3A:
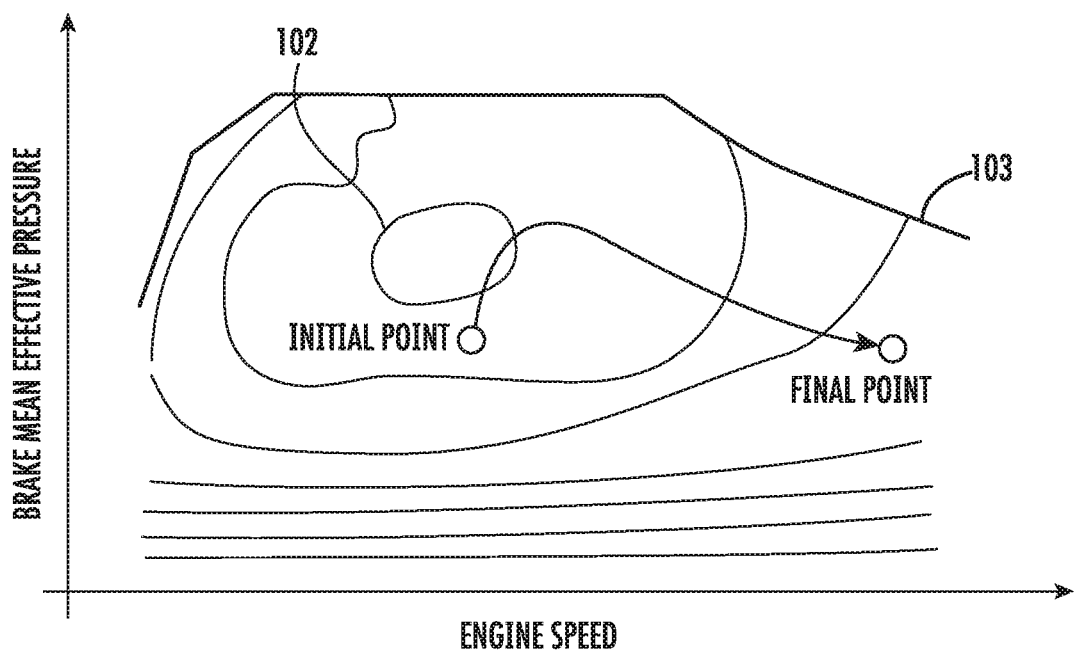
FIGS. 3A-B are schematics showing the paths for transition from low power to high power.
Figure 3B:
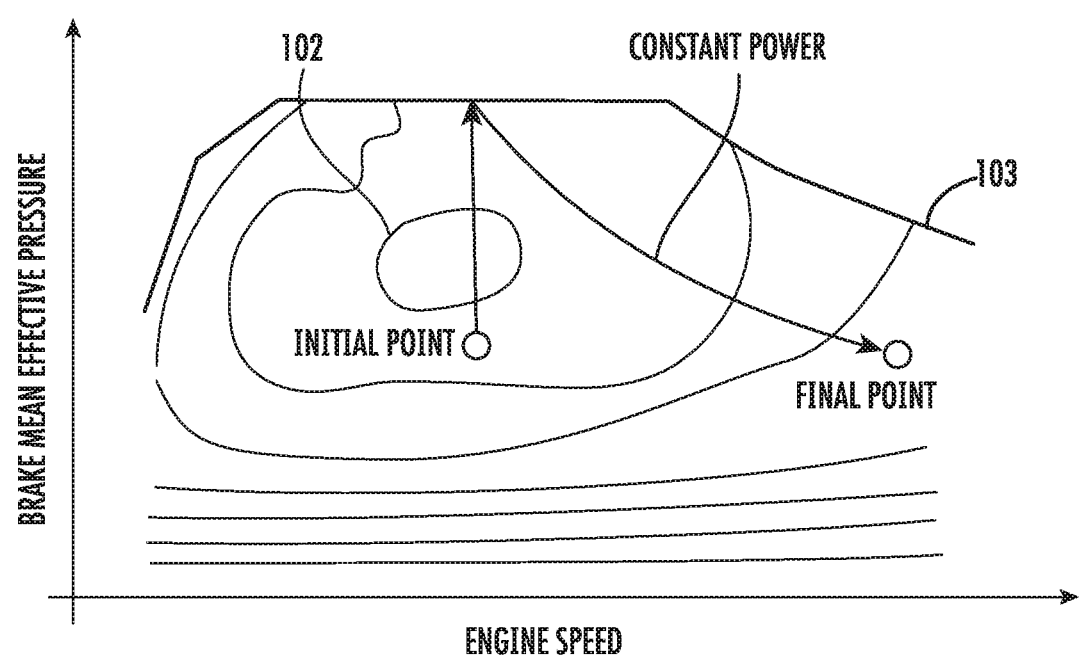

FIGS. 3A-B show two means of changing from an initial point of low power to a final point of high power. In the case of FIG. 3A, both the engine torque and the engine speed are varied simultaneously to arrive at the desired high power point (which is upspeeded in order to decrease the amount of alcohol required for knock free operation). Variation of the engine speed is accomplished by adjustment in the transmission (adjusting the gear ratios to speed up the engine). For simplicity, FIGS. 3A-B assume a continuously variable transmission (CVT). For other applications with discrete gears, the path will involve discrete jumps when the transmission shifts. However, the main point of adjusting the engine torque/speed to provide the required torque applies. Alternatively, as shown in FIG. 3B, at constant engine speed, the required change in power is delivered by increase in pressure boosting, which requires increased alcohol consumption. It is possible to reach high power faster than in the case of FIG. 3A, which requires a change in the engine speed.

The alcohol could be ethanol or methanol. It could be neat alcohol, a high concentration alcohol-gasoline mixture or an alcohol-water mix. This alcohol fuel could be provided by external fill. Alternatively, it could be provided by on-board separation from a low concentration mixture of alcohol and gasoline such as E10.

As shown in FIG. 3B, the use of the alcohol octane boost could be discontinued when the short period during which the rapid response is required is over. At this time, the higher engine speed (with the torque brought back to the normal torque range) is used for sustained higher power operation. The return of the torque to the lower torque range (with upspeeded operation) makes it possible to reduce the amount of alcohol.

The time duration for the increase in alcohol introduced into the engine would typically be greater than 1 second and less than 20 seconds. Assuming that the alcohol is a substantial fraction of the fuel needed during these torque excursions, and that the duration is about 10 seconds, then the alcohol consumption for a medium duty vehicle engine operating at 300 kW would about 100 milliliters per event.

Since the time during which the power boost is needed for improved engine response is short, the amount of on-demand alcohol or an alcohol-water mixture that is needed over a drive cycle can be very small. It could be in the same low fraction of gasoline fuel use as diesel exhaust fluid is of diesel use (e.g. preferably less than 2%).

Figure 4:
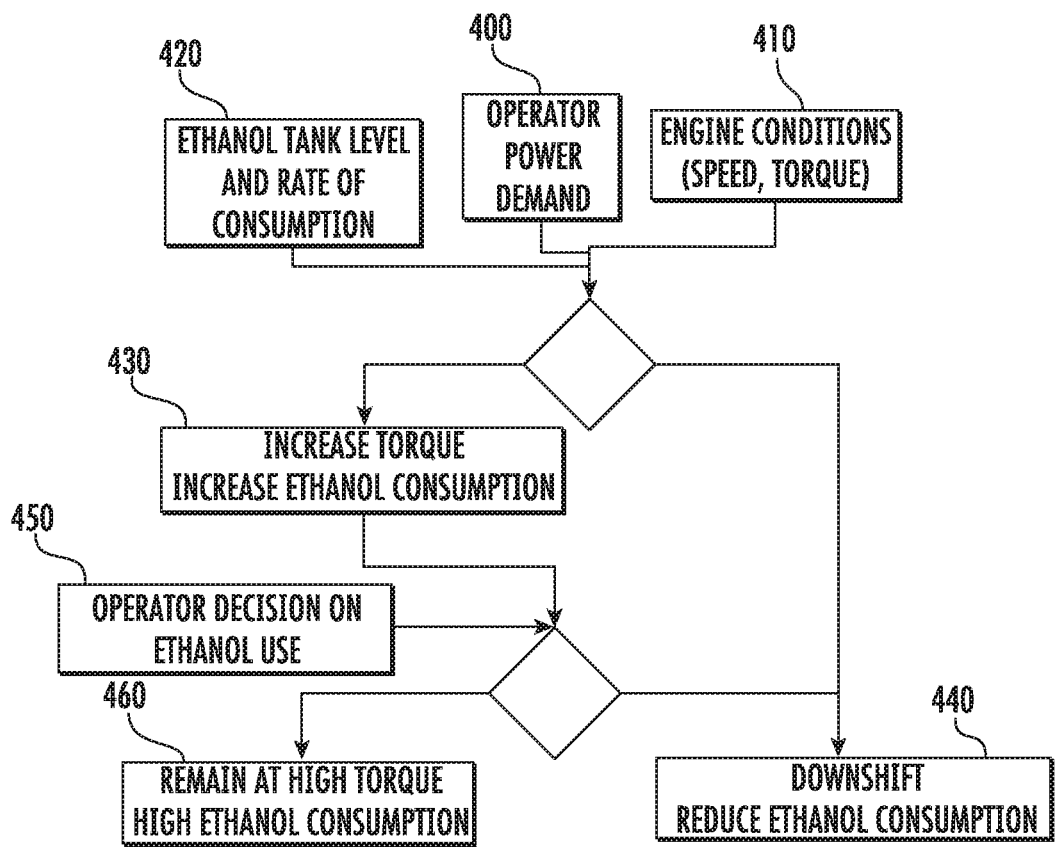
FIG. 4 shows a control system for using alcohol injection for a very short time increase in engine power.

A control system for using alcohol injection for a very short time increase in engine power is shown in FIG. 4. The operator demands for a quick substantial increase in power, as shown in Box 400. With information about the engine conditions 410, (such as speed, torque), and from information about the ethanol second tank 420 (such as fluid level, average consumption rate in recent history), the control system determines whether to increase torque and ethanol consumption (see Box 430) or to downshift and reduce ethanol consumption (see Box 440). Furthermore, input regarding settings adjusted by the operator are also used. These settings may include rapid response mode, which may be considered to be aggressive driving with high ethanol consumption; ethanol-saving mode, which is upspeeded operation with minimized ethanol consumption; or a mode between these. Based on this operator decision, as shown in Box 450, the engine control unit chooses a path to high power. For the ethanol saving mode of operation, the engine downshifts to Box 440 (uses a higher ratio of engine speed to wheel speed) and upspeeds the engine in order to reduce BMEP and thus reduce ethanol consumption.

In the rapid response mode, shown in Box 460, the turbo kicks in and the throttle opens quickly, with the engine operating at high torque and high ethanol consumption. Once the engine meets the power demand, the engine decides if it wants to proceed to upspeeded operation or maintain high torque, low engine speed. This operation results in high instantaneous rate of ethanol consumption, but also high efficiency. Alternatively, in the ethanol-saving mode, the control unit downshifts, increasing the engine speed and then adjusts the torque, until the desired upspeeded point is reached.

Short Duration Electrical Propulsion in Upspeeded Engines

The need for improved engine response, especially starting from low power, can be obtained by a short term additional power boost through the use of a limited hybrid mode of operation where additional engine power, when needed, could be provided by a short, high power addition to the engine output power.

The power addition could be from a starter motor of increased size which provides power that rotates the crankshaft. The power boost would be for the very short time in which the power level is changed. It need not be used for sustained operation at high power. The energy needed to be supplied during the transient before the engine reaches speed, can take on the order of a few seconds, for example up to 10 or 20 seconds and less than 50 seconds and preferably less than 20 seconds. For example, an engine with a peak power of 200 kW could use 40 kW boost during the transient, for 15 seconds, corresponding to an energy storage of more than 0.2 kWhr. The energy supply needs to be recharged by the engine. There is a limit on hybrid assist, as the energy system needs to be recharged.

After the higher power and torque level in the engine has been obtained by increasing the engine torque and power for a short time, the higher power level can be maintained by using increased engine speed (with the torque brought down to the normal torque range) when the increased speed becomes available over a longer response time than the increased torque provided by the starter motor.

A control system is employed to determine the relatively short period of time that electric power assist from the starter motor is used to provide an increased power level before the higher power level is provided by increased engine speed using increased combustion power. It uses both active control employing sensed parameters (e.g. engine torque and speed) and information from a lookup table.

For short power bursts, a supercapacitor could be used as the energy source. Alternatively, a battery could be used but since power, rather than energy is needed, a high power supercapacitor may be more suitable.

For a change in power starting from low RPM, the control system could use the same approach as described for short duration alcohol boosting. Instead of short duration alcohol boosting, the electric propulsion system would add to the engine power level. After high power had been obtained, use of increased engine speed would be used to provide the same level of power at a lower value of torque through use of upspeeding, as shown in FIGS. 3A-3B, and the electric assist would then discontinue.

The use of a short duration electrical power boost could facilitate the use of upspeeding in modified gasoline engines, such as gasoline turbocharged direct injection engines, since higher strength blocks and other components that could be necessary for short term higher BMEP operation would not be required.

It may also be advantageous to use a combination of very short time electric power boost and alcohol, an alcohol/water mixture or water injection enabled power boost.

Variable Compression Ratio During Power Transients in Upspeeded Engines

Variable compression ratio could be used to suppress knock during power transients. When a change to high torque is needed at low RPM, the compression ratio can be decreased during the change and then increased back to a high value after a longer term increase in speed and reduction in torque is used to enter the upspeeded regime.

For a change in power starting from low RPM, the control system could use the same approach as described for short duration alcohol boosting. Instead of short duration alcohol boosting, temporary operation at reduced compression ratio would increase the engine power level by changing torque rather than speed without the requirement for increased knock resistance provided by alcohol. After high power had been obtained, use of increased engine speed would be used to provide the same level of power at a lower value of torque through use of upspeeding, as shown in FIGS. 3A-3B.

It may also be advantageous to use variable compression ratio in combination with limited alcohol boosting.

Heavy and Medium Duty Vehicle Engines

Upspeeded operation can be particularly attractive for reducing alcohol use for heavy duty and medium duty vehicles using dual fuel gasoline-alcohol engine operation. These engines would provide energy-based efficiency that is comparable to diesel engines.

One option for the upspeeded engines is to use modified gasoline turbocharged direct injection (GTDI) engines in widespread use in light duty vehicles. Modified naturally aspirated gasoline engines might also be used.

One approach for a vehicle using a modified GTDI engine operated with upspeeding and high compression ratio is to employ short duration electrical propulsion for providing the desired response time and to utilize an ignition source that is more effective than a spark plug. Use of a more effective ignition source can improve the combustion rate and provide higher efficiency at high RPM than would otherwise be possible.

An especially effective ignition source is a prechamber which introduces a hot gas into the cylinder where the hot gas provides a more powerful and more widespread ignition source than a spark plug. Alcohol can be used both to prevent knock in the cylinder and to also enhance prechamber capability by its relatively fast flame speed and reduced propensity to soot relative to gasoline. The alcohol could be obtained by onboard separation of alcohol from a low alcohol concentration alcohol-gasoline mixture.

A second option for upspeeded engines for medium and heavy duty vehicles is to use modifications of compression ignition or spark ignition natural gas engine technology that is in use in medium and heavy duty vehicles.

In order to facilitate use of modified compression or spark ignition natural gas engines, which are themselves generally modified diesel engines, gasoline or low concentration gasoline-alcohol mixture can be introduced into the engine by conventional closed valve port fuel injection and the alcohol for alcohol boost can be introduced by open-valve port fuel injection. Open-valve port fuel injection provides some of the vaporization cooling benefits of direct injection without requiring the additional cylinder penetration for direct fuel injection.

An issue that could arise with open-valve fuel injection using present low pressure port fuel injectors is the evaporation of the fuel in the manifold, decreasing the evaporative cooling of the charge in the cylinder. This issue is addressed by using higher pressure fuel injection so as to reduce droplet size and minimize manifold wall wetting. It is estimated that the preferred average droplet size may be less than 20 microns. The desired injector pressure could be determined from measurement of particulates in engine tests. Pressures in swirl injectors may be higher than 40 bar. Alternatively, air assisted injectors or sonic injectors could also be used.

The use of very small droplets in the manifold would limit wall wetting in the manifold. The spray orientation would be directed towards the valves, but the injectors would be operated during times when the valves are open. The air motion as it is sucked into the engine would carry the small aerosols, minimizing wetting of the valves or the walls in the inlet manifold. The goal is to minimize the formation of liquid pools. By introducing the aerosols into the cylinder, the evaporative cooling of the cylinder charge is maximized.

The timing of the opening of the injectors can be adjusted to serve multiple processes. For example, introducing the fuel droplets into the cylinder early in the inlet stroke maximizes charge cooling in the cylinder, allowing increased air and thus, increased power. However, late evaporation of the droplets, and in particular, evaporation of the droplets after inlet valve closing, maximizes the cooling effect, maximizing the antiknock effect of the injected alcohol. Another feature of the injection timing would be to maximize the mixing. By introducing a mixture of fuel droplets and air of relative constant ratio air/fuel ratio, creation of a highly homogenous air/fuel mixtures is possible. This is achievable by operating the injector during the time when the valve is open.

An illustrative example of the use of upspeeding in a heavy duty vehicle is its use in a 6.7 liter ethanol-enabled higher efficiency gasoline engine that is employed as an alternative to a representative 12 liter diesel for long haul heavy duty trucks. The representative diesel engine provides a maximum power of 320 kW at 1800 RPM.

This illustrative spark ignition engine, which has a compression ratio of 13, would provide the same torque from the wheels and the same power or greater power from wheels as a diesel engine and an efficiency is that comparable to that of the diesel.

Based on computer modeling calculations, with no upspeeding, the maximum instantaneous required ethanol fraction during a driving period for the long haul truck is around 80%. Since most of the driving is at high torque, the average ethanol requirement over a drive cycle is assumed to be 40%. The efficiency is approximately equal to that of the diesel.

When upspeeding is not used, the engine torque in the illustrative engine is the same as that of the diesel but the power at the wheels can be 1.5 times that of the diesel due to operation at 1.5 times the diesel engine RPM.

Using upspeeding provides a substantial decrease in the ethanol fraction required over a driving period at the expense of a relatively small decrease in efficiency. The required ethanol fraction and efficiency decrease with increased upspeeding.

With an upspeeding ratio of two, the ethanol fraction could be reduced to around 10%. The ethanol could be provided by external fill of the second tank, by onboard separation of ethanol from a low concentration ethanol-gasoline mixture such as E10 or E20, or by a combination of external fill and onboard separation. The external fill could be provided by a pump that provides E85 or E100. The pump could be located at pump islands at service stations. The ethanol could also be provided at fleet refueling facilities.

For the case of employing both onboard fuel separation from E10 and external fill, the requirement for external fill of ethanol could be reduced to a few percent of the gasoline, which is similar to percentage of urea diesel exhaust fluid that is required for diesels. The modest fuel pump and ethanol storage requirements would be similar to that for diesel exhaust fluid.

It is preferred that the relative decrease in efficiency from using an upspeeding ratio of 1.5 or more would be less than 3%.

As mentioned previously, the vehicle operator can choose the upspeeding ratio so as to meet certain drive period ethanol fraction goals at the expense of a small decrease in efficiency.

An example of the use of upspeeding in a medium duty vehicle is its use in a delivery truck where a 2.8 liter ethanol-enabled higher efficiency gasoline engine replaces a representative diesel engine which has a displacement of 6.7 liter. The compression ratio of the gasoline engine is 13.

With no upspeeding, the required ethanol fraction over a driving period is around 10% since most of the driving is at low torque. Use of onboard fuel separation can reduce the external fill requirement to a few percent. With no upspeeding, the ethanol-enabled gasoline engine can provide the same efficiency and engine torque as the diesel engine and around 1.5 times the power at the wheels.

Upspeeding can reduce the driving cycle ethanol requirement to a few percent at the expense of a few percent decrease in efficiency. This drive cycle ethanol requirement could be readily met by onboard fuel separation of ethanol from E10.

In contrast to modified GTDI engines, modified medium or heavy duty diesel or natural gas engines provide the advantage of being able to operate at higher values of peak pressures due to the greater strength of the engine blocks and other components. The higher peak pressure provides the capability for using higher BMEP operation for a quicker response using limited alcohol boost as described previously.

The above options could be used in light duty vehicles as well as in medium and heavy duty vehicles.

Light Duty Vehicles

For light duty vehicles, it is preferred that the upspeeded engine should be capable of operating for more of the time at high engine speed, such as between 3000 and 6000 RPM, instead of mainly between 1500 and 3000 RPM in present vehicles.

The average engine speed over a drive cycle (e.g. the UDDS or US06 drive cycle) could be at least 1.5 times and preferably at least 2 times what it would be if upspeeding were not employed. Upspeeding should generally be avoided when the engine would be operating under conditions where the engine efficiency is low, because of the sharp drop in engine efficiency at lighter torques (due to increased pumping losses), as shown in Line 104 of FIG. 2.

A representative present light duty gasoline engine with a 2 liter displacement engine with a compression ratio of 10 could be replaced by 1.0 to 1.5 liter engine with the same power using an upspeeding ratio of 1.5 to 2.0, thereby providing an increase in efficiency of around 8-15%. A further increase in efficiency could be obtained by increasing the compression ratio to the 12 to 14 range. This increase could be enabled by higher knock resistance that is provided by alcohol and/or water injection. The combination of these increases in efficiency could provide an efficiency that is close to or comparable to a light duty vehicle diesel engine.

The alcohol could be provided by on board fuel separation from a separation of alcohol from a low concentration alcohol blend of gasoline and alcohol or by refill of an external tank at a regular oil change or by a combination of both.

For a 3.5 liter turbocharged DI gasoline engine that is a representative engine used in light duty trucks, upspeeding could enable a reduction in size to 2.2 to 2.8 liters. This additional downsizing could increase engine efficiency by at least 8% and preferably 10% and enable gasoline turbocharged direct injection engines to provide an efficiency approaching that of light duty diesel vehicles with the same torque and power provided by the wheels. These engines would be downsized by around 60% relative to naturally aspirated gasoline engines.

With a modest amount of alcohol use for knock control at high torque, the engine could be operated with a high compression ratio, such as in the 12 to 14 range, thereby providing a further increase in efficiency. Using dual fuel operation, the alcohol requirement over a drive cycle could be reduced to that which could be supplied by onboard fuel separation from a low alcohol concentration alcohol-gasoline mixture such as E10 or M15. A further reduction in alcohol use could be obtained by using the alcohol in combination with water recovery from the vehicle, from the exhaust and/or air conditioning.

Although operation at high BMEP is achievable in this engine, the amount of operation at high BMEP would be reduced or minimized by use of upspeeding. Engine responsiveness would be maintained by limited use of alcohol boosting during power transients starting from low power operation. Alternatively or in combination with short duration alcohol boosting, short duration electric propulsion or variable compression ratio operation could be used.

Variable compression ratio could also be used to enable higher maximum compression operation at low loads. This could increase the efficiency to a diesel-like efficiency level.

The upspeeded operation approaches described in this disclosure can be applied to E10 as well as gasoline. They can also be applied to the use of mid level blends (e.g. E20-E40 blends). Use of these higher concentration blends can enable further increases in efficiency, for example by allowing the use of higher compression ratio.

The increased pressure boosting could be provided by changing waste gate settings or by use of an e-turbocharger or supercharger. Other presently used turbo charged direct injection engines could be reduced in size by the same factors.

Very small engines (such as 1.0 liter or less) that operate at very high engine speed could potentially be provided by the types of engines that are used in snowmobiles and motorcycles.

Upspeeding could be used in light duty vehicles that use variable addition of alcohol, or alcohol and water from a separate tank. The previously described control features could be used.

Use of a prechamber can improve the combustion rate and provide higher efficiency at high RPM than would otherwise be obtained.

Upspeeding in Engines Using Natural Gas and Other Fuels

The approaches described above for achieving higher engine speed operation of SI engines and for using upspeeding to reduce knock resistance requirements for a given level of downsizing could be employed to increase efficiency, and enable use of lower methane number fuel (octane number), and/or obtain higher power operation in SI natural gas engines.

The variable upspeeding control system could be used to adjust upspeeding so as to enable lower BMEP operation, thereby preventing knock when natural gas fuel with lower octane number (lower methane number) is utilized. The control system can determine the minimum amount of upspeeding that is needed to prevent knock.

This approach could also be used in other spark ignition engines where the knock resistance of the fuel varies, including engines powered with fuel from a single fuel tank which is filled with varying mixtures of alcohol and gasoline or gasoline of varying chemical octane levels.

The previously described control approaches for varying upspeeding use and for improving response for engines that use upspeeding could be employed for these engines. These approaches include limited alcohol boost, limited electrical propulsion, and variable compression ratio for improving responsiveness of engines that use upspeeding.

A prechamber could be used to increase the combustion rate in natural gas engine and thus enable higher efficiency at high RPM. It is preferred that the prechamber enable at least a 3% higher efficiency at an RPM level that is 4000 RPM or greater. The prechamber could be fueled with alcohol that is provided by a separate tank. The prechamber should operate fuel-rich. Preferably, the prechamber provides jet-ignition of the main chamber, by having small holes through which flow the products of combustion in the prechamber, at high speed.

These approaches could be applied to other SI engines with a single fuel coming from a single tank, such as propane or a mid level gasoline-alcohol mixture, such as E30 or M30.

Another embodiment that involves higher RPM operation is to use a prechamber in an SI engine fueled with ammonia. Ammonia has a flame speed that is around one fifth of gasoline. This slow flame speed can impose substantial constraints on regions of operation in the engine map, including a limit on high RPM operation. The use of an alcohol enhanced prechamber could considerably reduce this constraint.

Similarly, the prechamber could be operated on natural gas. The prechamber should operate rich, either on ammonia or on natural gas, in order to provide hydrogen rich, hot gas that is ejected from the prechamber at high speed and ignites the main chamber.

Engines With Increased Maximum RPM and Power Density

The potential for the higher RPM approaches that have been previously discussed could be significantly enhanced by use of engines with increased maximum RPM and power density.

Since the required BMEP and alcohol requirement for knock suppression for a given torque at the wheels scales inversely with the engine speed, a key parameter that can be used in maximizing the advantage of upspeeding is to increase the maximum engine speed and power at which the SI gasoline engine can be operated. By operating at higher torques at higher speeds, the engine power can be increased.

A major obstacle to higher engine speed and power operation has been the limit on turbocharger operation. One means to reduce this obstacle is to use turbo designs that increase the temperature at which the turbocharger is operated. As a result of progress in materials that can be used for turbochargers, turbochargers can now be operated at 1050° C. instead of the lower temperatures that are presently used. In addition, better cooling systems for turbochargers can be employed to keep temperatures below the maximum allowed inlet temperature.

It may be possible to use a water injector upstream from the exhaust turbine to reduce the temperature of the exhaust. The water would have to be injected into the exhaust manifold. Alternatively, it may be possible to inject water or a similar cooling fluid into the cylinder late in the expansion or during the exhaust strokes. The water could be obtained from water in the engine exhaust.

The injected water could operate as an open cycle Rankine cycle, with hot, high pressure water expanded through the turbine. The water could be heated by waste exhaust heat, recovering some of the energy that flows into the exhaust (waste energy recovery). The water could be recovered from the exhaust.

Use of 3-D printing could enable more optimal material use in turbo-chargers that could enable higher temperature operation. Turbochargers with passive cooling elements (such as heat pipes) could be built using 3D printing.

Higher average temperature turbocharger operation could also be enabled by use of an array of temperature sensors at various positions in the turbocharger. These sensors could be used in a feedback control system to provide temporarily enhanced cooling in selected locations. The cooling could be provided by fasting acting coolant injectors.

Supercharging can also be used to increase maximum engine power, as can a combination of turbocharging and supercharging using an electrically driven turbocharger (an e-turbo).

Decreased exhaust temperatures can also be achieved by using larger expansion than compression in the cylinder. In this case, both the exhaust pressure and the exhaust temperature are decreased compared to conventional turbocharged engines. However, especially at high power and mid to high torque, there is enough power to drive the turbine, but at lower temperatures. This type of operation can be achieved by using flexible valve timing, or Miller cycle, among others.

Mechanical design of the engine could also be employed to enable most of the engine operation at higher engine speed. Higher engine speed operation can be enabled by larger bore to stroke ratios, faster acting valves, larger valves, and improved bearings. The increased bore to stroke ratio decreases the maximum speed of the piston (and the travel distance for the piston) for a given cylinder volume. The faster acting valves includes the use of light materials (low inertia), increased spring stiffness, or electrically actuated valves.

The use of upspeeding to enable downsizing of SI engines relative to present gasoline turbocharged direct injection by factors of 1.5 to 2.0 can in turn enable higher engine speed operation which is made possible by use of a smaller engine.

Efficiency can decrease at high engine speed due to engine breathing difficulty. However, modern engines have managed to keep efficiency relatively flat over a wider range above open throttle operation than earlier engines independent of engine torque or speed. Breathing can be improved by larger valves, different valve design, increased bore-to-stroke, and more valves per cylinder.

Efficiency can also decrease at high engine speed due to an inadequate rate of combustion. A higher energy spark ignition system can be used to improve the rate of combustion and thereby increase efficiency at high RPM.

Another option for increasing the rate of combustion is to provide robust ignition over a larger region in the cylinder by use of a prechamber. Prechamber capability can be increased by using a fuel that has a high alcohol content in the prechamber. The alcohol for the prechamber can be provided by onboard separation and/or by external fill of a secondary tank.

It is preferred that the use of a high energy spark or a prechamber increase the efficiency of the engine at 3600 RPM or greater by at least 3%.

High RPM Gasoline-Alcohol Engines in Series Hybrid Powertrains

High RPM operation (preferably at least 3500 RPM averaged over a drive cycle when the engine is operating) can also be used to reduce knock resistance requirements for engines powered by gasoline and alcohol in both plug-in and non-plug-in series hybrid powertrains. This can be especially useful for hybrid powertrains in heavy duty trucks. It can also be important for medium and light duty trucks and for cars. Series hybrid operation can increase drive cycle efficiency by operation of engines in the most efficient regions of the torque speed map, by stop start operation and by use of regenerative braking.

Plug-in hybrids can additionally make use of externally charged battery power. One mode of operation of a plug-in hybrid is the range extender mode where an internal combustion engine is used to provide the power for vehicle operation when the battery energy from external charging is exhausted.

Series hybrid operation is especially of interest for plug-in hybrid operation. In a series hybrid, the vehicle propulsion is provided by one or more electric motors. The electric power is provided by an engine generator which produces electricity for the battery. The battery provides power to the motors. The engine generator can also provide electricity directly to the motors. In a plug-in hybrid, electric power is provided to the battery by externally charging as well as by an engine generator.

The engine generator output can be sized to provide electrical power which is roughly equal to the average power needed over a driving cycle. The battery provides the varying amount of power needed by motors over a driving cycle. The use of the battery in a series hybrid powertrain allows the engine to be operated at open-throttle high efficiency region of the engine torque and speed map.

High RPM operation is useful for the electricity generating equipment. The size of the generator is decreased by operating at higher frequency (corresponding to higher engine speed). In addition, the challenges of the power conditioning equipment, such as rectifiers, transformers, and power filters, are simplified by higher frequency. It is preferred that the electricity generating equipment incorporate some or all of these advantages.

Figure 5:
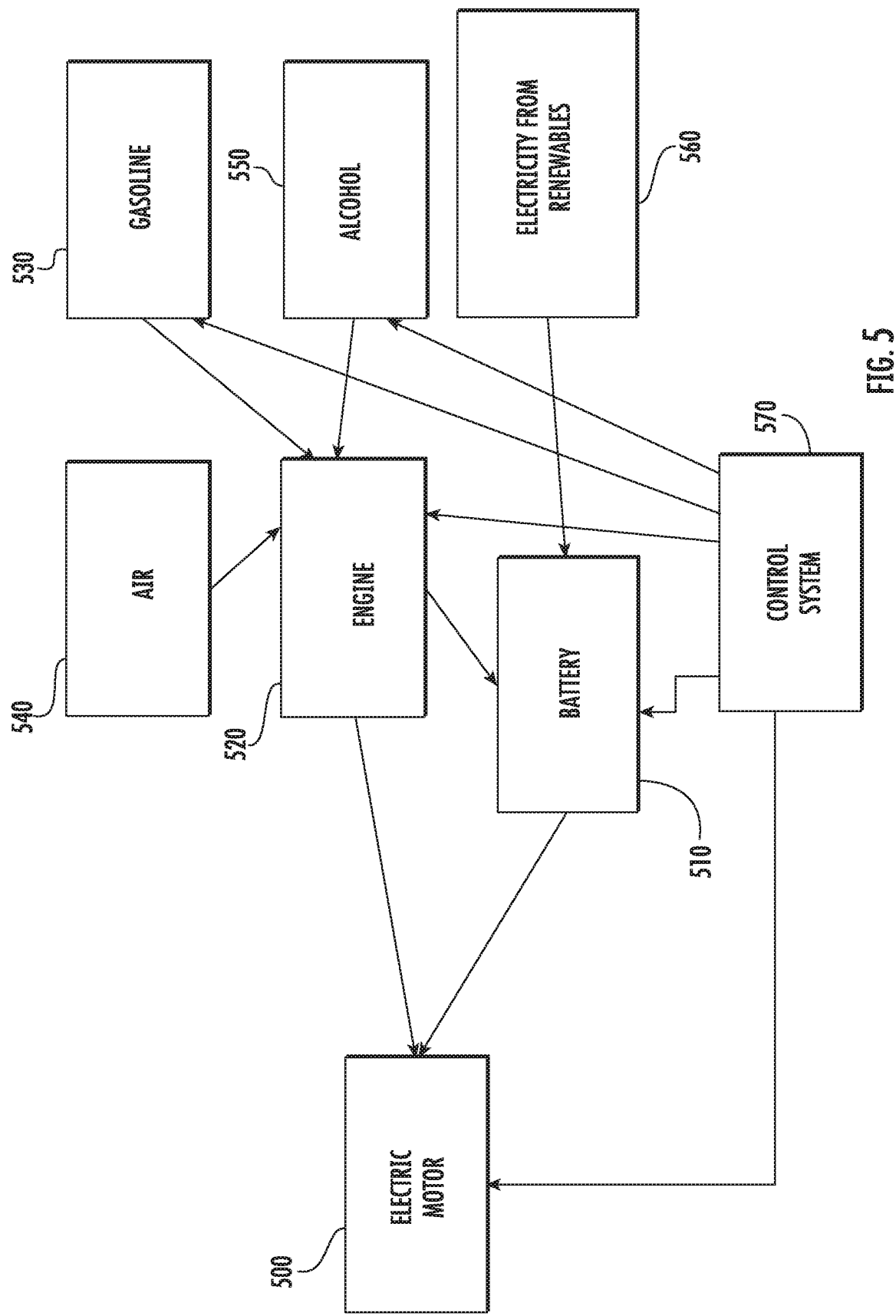
FIG. 5 shows the integration of a battery with an engine running on gasoline-alcohol fuels in a series hybrid. The battery is recharged by both plug-in renewable power as well as by the engine.

FIG. 5 shows a hybrid power system where the electricity for the electric motors 500 is provided by the battery 510 or directly by an alcohol enhanced gasoline engine generator 520 which also provides electricity to the battery 510. The engine generator 520 is fueled with gasoline 530, air 540 and alcohol 550. In the range extender mode, the electricity is first supplied only by an externally charged battery 510 until the battery 510 cannot be used without additional charging. The engine generator 520 then provides electricity to extend the range. It is also possible to operate the electric motor 500 with the electricity provided by the battery 510 and by the engine generator 520. It is preferred that the electricity for external charging of the battery be provided by a renewable electricity source 560. A control system 570 may be used to determine the mode of operation.

Alcohol enhanced gasoline engines can provide important advantages over diesel engines for series hybrid powertrains for medium and heavy duty vehicles. The use of alcohol enhanced gasoline engines can provide 90% lower tailpipe NOx than the cleanest diesel engines using state of the art exhaust treatment technology. They can also provide lower tailpipe particulate emissions. This makes possible near zero emissions from hybrid powertrains operated in the range extender mode and other modes. Achieving the lowest possible emissions from the internal combustion engines using readily available affordable fuel is a key component in obtaining the near zero emissions regulatory goals that are associated with a zero emission vehicle objective. If desired, even lower NOx emission can be obtained by greater use of EGR in the alcohol-gasoline engines.

Alcohol enhanced gasoline engines also provide options for higher power than diesel engines, lower engine plus exhaust system cost and weight, and the option for flex fuel operation where the engine can be operated in the wide range of alcohol content from mainly gasoline operation to 100% alcohol operation.

Since the requirement on the engine in a series hybrid is a power requirement, an alcohol enhanced gasoline engine can be substantially downsized from a diesel engine. In other words, a much smaller engine may be used to provide the same power as the diesel engine by use of higher RPM operation without the use of an upspeeded gearing change.

The previously described approaches in this disclosure that enable the use of higher RPM operation while minimizing any decrease in efficiency can be employed to increase the attractiveness of alcohol enhanced gasoline engines in series hybrid operation.

These approaches include the use of a prechamber to obtain faster combustion in the cylinder and thereby mitigate or prevent reduction of efficiency at high RPM.

The use of the prechamber can also improve knock resistance from faster burn and the greater spatial extent of the ignition source in the cylinder. An additional benefit of using the prechamber is that it can enable the use of increased EGR which can provide additional reduction of NOx.

Fueling the prechamber with alcohol or a high alcohol concentration alcohol-gasoline mixture can provide better prechamber performance than when it is fueled with gasoline or a low alcohol concentration gasoline-alcohol mixture. Alcohol enhanced prechamber operation can further increase the combustion rate and provide greater knock resistance.

The alcohol enhanced gasoline engines in series hybrid powertrains would generally operate at an average RPM over a drive cycle of between 2800 and 4000 RPM and preferably at least 3500 RPM. For some embodiments, the average RPM over a drive cycle would be 4000 RPM or greater. In contrast, diesel engines typically operate at less than 2000 RPM.

An example of an alcohol enabled higher efficiency gasoline is one that may be an alternative to a diesel engine range extender for a hybrid vehicle version of a 12 liter diesel engine. This size diesel engine is used in long haul heavy duty trucks. For long haul operation, this range extender diesel engine would provide an illustrative average power (average power when the engine is operating) that is around 60% of the maximum power of the non hybrid diesel engine. For a 320 kW capability of a 12 liter diesel, an illustrative diesel engine would provide around 190 kW and would have a displacement of 7.2 liters.

A 3.0 to 4.5 liter alcohol-gasoline engine with around twice the BMEP of a diesel engine could provide the same torque and power at the same RPM as a 7.2 liter diesel engine. By operating at around twice the RPM as a diesel engine, for example at 3900 RPM, the engine could provide around the same power with around the same BMEP as a diesel engine.

Both 15 liter and 12 liter diesel engines are also used in long haul heavy duty vehicles. A 4.0 to 6.0 liter alcohol-gasoline engine would be an appropriate size engine for a series hybrid engine that would be an alternative to a 15 liter diesel engine in a non-hybrid powertrain. Thus a representative total cylinder volume for a high RPM SI engine system (which could be comprised of either one or two engines) fueled by gasoline and where alcohol, alcohol, or an alcohol/water mixture is introduced in the cylinders is in the 3.0 to 6.0 liter range.

According to modeling calculations, by providing around twice the power density of a diesel engine, the alcohol enhanced gasoline engine could provide comparable efficiency to the diesel engine if the spark ignition engine had a compression ratio of around 13 to 14.

A BMEP that is comparable to a diesel engine (around 100 lb-ft/liter) can be enabled by the knock resistance that is provided by the evaporative cooling from direct injection of regular gasoline in an engine with a compression ratio of 10. Alcohol, water, or a mixture of alcohol and water is necessary to provide the knock resistance needed to allow operation with a compression ratio of 12 to 14. This increase in compression ratio provides an efficiency increase of around 5-8%.

By operating at twice the RPM as the diesel engine, the increased knock resistance requirement for providing comparable efficiency is roughly only that which is needed to enable a compression ratio increase of around 2 to 4 relative to a conventional gasoline engine. According to modeling calculations, this would require an average alcohol fraction of the total fuel volume of around 30% or less.

The alcohol could be provided by use of a mid level blend of gasoline and alcohol, such as a 2 mid level alcohol-gasoline blend such as E30 or M30. It is preferable that the gasoline alcohol blend be introduced into the engine cylinders by direct injection or by open-valve port fuel injection so as to obtain knock resistance from evaporative cooling as well as from the higher chemical octane of alcohol.

Alternatively, dual injection could be used where gasoline or a low alcohol concentration gasoline-alcohol blend is introduced by one injector and alcohol, an alcohol/water mixture, or water is introduced by another injector. The use of two injectors facilitates the use of water or alcohol-water mixtures.

Figure 6:
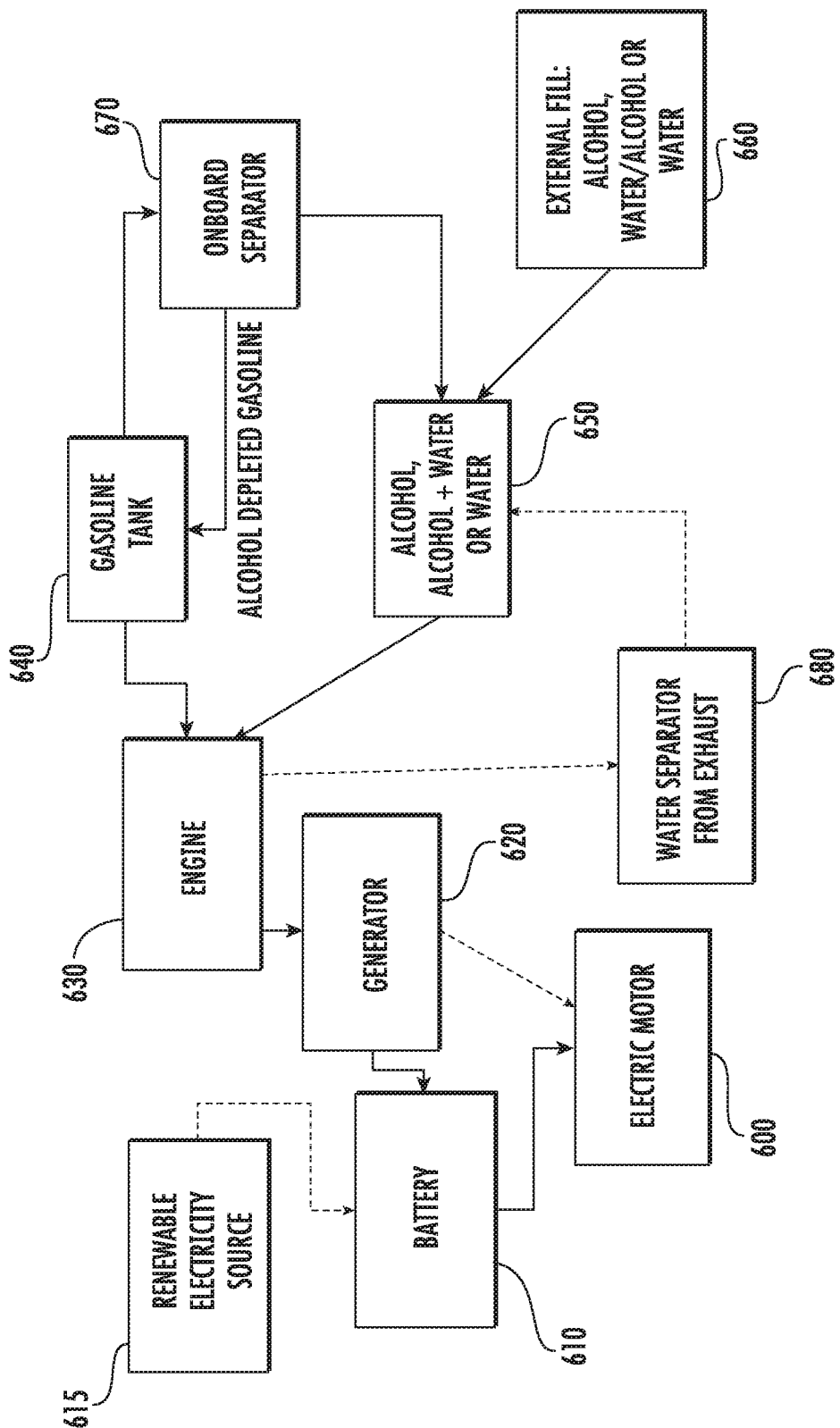
FIG. 6 shows a system having a hybrid powertrain, with alcohol provided by either onboard separation of alcohol from the gasoline tank, or external fill of a tank with alcohol, an alcohol-water mixture, or water.

One approach for using water is shown in FIG. 6. Reducing or minimizing alcohol use is achieved by operating as much as possible using water to provide the required knock resistance and using alcohol when water is not available. The electric motor 600 is powered by either the battery 610 or by a generator 620. The battery 610 may be charged by the generator 620 or by a renewable electrical source 615. The generator 620 is powered by an engine 630, which is fueled by gasoline from a gasoline tank 640 and alcohol and/or water. The water could either be provided by external fill of a storage tank 650 and/or by recovery from the vehicle, for example by recovery from the exhaust using a water separator 680. The alcohol could be provided by a separate tank 650 which could be supplied by external refill 660 and/or by use of an onboard separator 670 to derive the alcohol from an alcohol-gasoline mixture.

An example is this approach is to use alcohol only during the brief periods of time, such as the first 100 seconds, when the engine is cold and sufficient water is not yet available. Increased spark retard could be used during cold start to reduce the knock suppressing fluid requirement during the short periods of time when water is not available. This approach could also be employed for engines used in vehicles that do not have hybrid powertrains.

Another approach for addressing issues related to operation of the engine in a hybrid powertrain when it is cold, is to operate it at low load until it is warmed up and use stored electricity in the battery to make up for the lower electricity production from the engine. During the engine start-up, when the engine and catalysts are cold, the engine operates at low load, low power until warm enough to start generating water. Low load, low power operation greatly reduces or eliminates the amount of alcohol or water or alcohol/water mixtures that are needed to prevent knock. Once the engine warms up and water retrieving is re-established, the engine operation can switch to high power. The exhaust system and the catalyst are thermally insulated in order to minimize the period when the engine is operational but the catalyst is cold. A temporary increase in spark retard can also be used to heat the catalyst. As the engine is only used to provide electricity when needed, turning on and off occurs at more frequent intervals than when the engine is the prime mover. It is desirable to minimize catalyst cool-down during the off-periods of the engine, and to minimize the time for achieving catalyst light off when restarted.

The engine can also be operated in this manner (low load engine operation when battery recharging is not demanded) during times when exhaust heat is needed for cab warming or to warm up the fuel separator or the three-way catalyst.

An alternative or additional means to reduce the requirement for the addition of alcohol in the cylinder is to use a prechamber to increase the combustion rate, thereby facilitating operation at higher RPM without a decrease in efficiency, and also providing greater knock resistance by reducing the load while maintaining the engine power level.

One option for providing the 4.0 to 6.0 liter alcohol enhanced gasoline engine is to modify a 4.5 liter diesel engine. One configuration for fueling the engine would be to use open-valve port fuel injection of alcohol, an alcohol/water mixture or water. The gasoline could be introduced into the engine by open or closed valve port fuel injection or by direct injection. The spark will take the place of the diesel fuel injector in the engine head. Another embodiment could be to use a single injector for introducing a medium level alcohol-gasoline blend, such as E30 or M30.

The use of the diesel block could enable operation of the engine at up to twice the diesel level BMEP. This could allow the capability for providing more additional power for the electric motors for hill climbing and passing through the use of greater amounts of alcohol.

Another option for providing the 4.0 to 6.0 liter alcohol enhanced gasoline engine would be to use a gasoline turbocharged direct injection (GTDI) engine or two gasoline turbocharged direct injection engines. The GTDI engine has the advantage of having a direct injector and could be readily modified to provide high compression ratio operation. The direct injector could introduce gasoline or a medium level blend of gasoline and alcohol such as E30. If a dual injection configuration were to be used, gasoline or a low alcohol concentration gasoline-alcohol mixture would be directly injected, and the alcohol, alcohol/water mixture or water could be introduced by closed-valve or open-valve port fuel injection.

Alternatively, two separate direct injectors can be used, one for the gasoline-like fuel and the second one for the high octane fuel. It is possible to have a single injector with two valves, or to separate injectors.

If shorter term higher power engine operation were needed, any substantial power increase would have to come primarily from an increase in power that does not involve an increase beyond the BMEP level of a GTDI engine. One means of doing this is to run the engine at higher RPM. For example, the engine may be operated at a level that is 5500 RPM or greater rather than 3500 RPM.

Another means of providing this capability in this example would be to use a GTDI engine with a displacement that is 4.5 liters or greater with the same power density as a smaller displacement engine.

Since the number of GTDI engines with more than a 4.0 liter displacement and especially with more than a 5.0 liter displacement is limited, it may be advantageous to use two GTDI engines of smaller displacement. An example would be the use of two 2.7 liter GTDI engines providing a total displacement of 5.4 liters. The use of two smaller engines could also facilitate operation at high RPM. Each engine could provide mechanical power for its own generator. The electricity from each generator would be sent to the battery. This multiple engine generator system could be especially useful for alcohol enabled high efficiency gasoline engine use in hybrid powertrains that would be employed in class 8 trucks that presently use 12 to 15 liter diesel engines.

High RPM alcohol enabled higher efficiency gasolines for series hybrid powertrains could be used in heavy duty, medium duty and light duty trucks and in cars. In addition to much lower pollutant emissions than diesel engines and the higher power capability, the lower cost of these engines and exhaust treatment systems, which is roughly about half that for a diesel engine, could provide substantial compensation for the higher cost of the hybrid powertrain relative to conventional powertrains.

The high RPM alcohol enabled higher efficiency gasoline engines for series hybrid power trains would generally operate at an average engine speed during driving in the 2500 to 4000 RPM range for trucks and preferably at an average engine speed that is greater than 3500 RPM. The average torque of the engine when it is operating would generally be in the 75-150 lb-ft/liter range; alcohol use would be generally be in the range of 2 to 30% of the gasoline use over a drive cycle. A prechamber or high energy spark ignition system may be used to increase efficiency at higher RPM or at higher levels of EGR.

The high RPM higher efficiency gasoline engine system would generally have a total cylinder volume (from one or two engines) of 4 to 6 liters for the replacement of a 12 to 15 liter diesel engine in a heavy duty (class 7 or 8) truck. The total cylinder volume would be 2 to 3 liters for a medium or light duty truck.

It is preferred that engine cylinder size be 500 cc or less. Keeping the size under this level can reduce propensity to knock and facilitate high RPM operation.

For plug-in hybrid operation, an alternative to the range extender mode of operation mentioned above is to use the stored energy in the battery to reduce the power requirement of the internal combustion engine over part or all of the drive cycle. The power can be reduced by reducing the BMEP. The reduced BMEP reduces the knock suppression requirement and can reduce or eliminate the need for the addition of alcohol, water or an alcohol/water mixture to prevent knock. However, operation of the engine at lower power increases the ratio of friction losses to power and can reduce efficiency. A control system 570 can be used to reduce knock suppression fluid use by use of stored energy from the battery as shown in FIG. 5.

The approaches described above for minimizing alcohol use in alcohol enhanced gasoline engines in series hybrids can be also be employed in parallel hybrid powertrains and in non hybrid powertrains.

In this and in other sections of this disclosure, the term "gasoline-alcohol" can also refer to an engine that is fueled with gasoline where there is no alcohol fueling and increased knock resistance is obtained solely by addition of water.

Flex Fuel Vehicles with Super High Efficiency Alcohol Operation

High RPM, alcohol enabled higher efficiency gasoline engine in both non-hybrid and hybrid powertrains could be operated in a flex fuel mode where the engine could be operated with alcohol alone or a high alcohol concentration alcohol-gasoline mixture as well as on mainly gasoline and alcohol-gasoline mixtures in between. Operation on gasoline alone could also be an option.

When operated with alcohol alone or a high alcohol concentration alcohol-gasoline mixture, the engine can provide higher efficiency by use of an alcohol enabled high performance exhaust heat recovery system.

The high performance exhaust heat recovery is provided by using exhaust heat to endothermically reform the alcohol into hydrogen and carbon monoxide (hydrogen-rich gas) which has higher chemical energy than the alcohol and which is then introduced into the engine. An increase in amount of the waste exhaust that is recovered can be also provided by Rankine cycle recovery of the energy from exhaust heat using pressurized alcohol as the working fluid. The high pressure syngas is employed to drive a turbine which produces electricity or is connected to the engine shaft (as in turbo-compounding), before being introduced into the engine as fuel. The use of electricity from the turbine could be used in both powertrains that do not employ electrical propulsion and powertrains that employ electrical propulsion.

The exhaust heat recovery is facilitated by stoichiometric engine operation that provides higher temperature engine exhaust than is provided by a diesel engine which is operated with a lean fuel to air ratio.

Engines that use this exhaust heat recovery technology could provide an efficiency that is around 1.15-1.20 times greater than diesel engines when the engines are operated with ethanol alone and around 1.15-1.25 times greater when operated with methanol alone.

Use of upspeeded operation in a non-hybrid powertrain or high RPM operation in a hybrid powertrain improves the overall efficiency of the heat recovery process by reducing the knock suppression requirement. If upspeeded or high RPM operation were not used to enable engine downsizing, a substantially greater amount of alcohol would have to be introduced into the engine to prevent knock that would occur in the higher BMEP operation necessary to provide the desired downsizing. Upspeeding and higher RPM operation allow greater heat recovery since a higher fraction of the alcohol can be used in the exhaust heat recovery system. The use of upspeeded engine operation or use of high RPM operation in a series hybrid powertrain can greatly reduce or eliminate the diversion of alcohol from use in exhaust heat recovery and thereby enable a greater efficiency than would otherwise be possible.

A control system can determine whether a series hybrid with flex fuel operation is operated in a range extender mode or in a series hybrid mode where the engine is used to generate electricity prior to exhaustion of the external charge provided to the battery. The control system can also be operated so that the relative amount of externally provided battery power versus alcohol use that is employed over a driving period can be changed. The relative use can depend on the changing availability and price of alcohol and externally provided electricity as the vehicle travels to different regions.

The use of the exhaust heat recovery technology in a series hybrid is also facilitated by the relatively constant level of power operation and the use of the electricity from the Rankine turbine in the hybrid electricity system.

The higher efficiency from exhaust heat recovery in a high RPM engine in a series hybrid could provide an efficiency of conversion of fuel into electricity that is 50% or greater and is comparable to hydrogen to electricity conversion in a fuel cell.

If the flex fuel engine is fueled with E85 or another high alcohol concentration alcohol-gasoline mixture, onboard fuel separation could be employed to separate the E85 into a higher concentration ethanol stream and a stream that is mostly gasoline. The higher concentration ethanol stream which is used in the energy recovery system, can be less prone to sooting in catalytic reformer conversion to syngas.

The separated gasoline can be stored in a separate tank from the E85 and when advantageous, it can be introduced into the engine by a separate fueling system different from that which introduces the syngas from reformed high higher concentration ethanol stream. The separated gasoline can be used for cold start. A small amount of E85 can also be used as is for cold start. The same approach could be used with a high alcohol concentration methanol-gasoline mixture such as M85.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A vehicle comprising:
a control system;
wheels; and
a spark ignition engine that is fueled with gasoline and alcohol and/or water, where engine upspeeding is employed to increase the speed of the engine and to enable operation of the engine at lower BMEP for a given amount of engine power;
and where, in upspeeded operation, a change in gearing is used to increase the ratio of engine speed to speed of the wheels and to reduce the BMEP provided by the engine for a given torque delivered by the wheels;
and where, when upspeeding is employed, the engine is operated with a smaller fraction of the total fuel being provided by alcohol and/or by water;
and where the increased ratio of engine speed to speed of the wheels that is employed when upspeeded operation is utilized is determined by the control system based on the resulting reduction in the alcohol consumption that is desired;
and where the increased ratio of engine speed to speed at the wheels that is employed when upspeeded operation is utilized is determined by the control system based on a decrease in efficiency that will occur.

2. The vehicle of claim 1 where, when in regions in an engine map where upspeeding would result in the engine operating below a selected value of BMEP, upspeeding is not employed.

3. The vehicle of claim 1, where cylinder deactivation is used to reduce a selected value of BMEP.

4. The vehicle of claim 1, where the level of upspeeding is changed so as to reduce the amount of efficiency loss that would be present if it were set at a fixed level.

5. The vehicle of claim 1, where the efficiency for an engine used in heavy duty or medium duty truck is decreased by less than 3% when an upspeeding level of 1.5 or more is used.

6. The vehicle of claim 1, where the compression ratio can be varied and a reduced compression ratio is selected for a driving period so as to further reduce consumption of alcohol, or water.

7. The vehicle of claim 1, where both reduced compression ratio and upspeeding are used during a driving period and the combination of a reduction of compression ratio and level of upspeeding are such as to provide a lower decrease in efficiency for a given reduction in alcohol consumption.

8. The vehicle of claim 1, where a prechamber is employed and efficiency loss that would otherwise occur from upspeeding is reduced by use of the prechamber.

9. The vehicle of claim 8, where alcohol is used so as to increase the effectiveness of the prechamber.

10. A vehicle, comprising:
wheels; and
a spark ignition engine that is fueled with gasoline and alcohol and/or water where engine upspeeding is employed to increase the speed of the engine and enable operation of the engine at lower BMEP for a given amount of engine power;
and where, in upspeeded operation, a change in gearing is used during a portion of the driving time to increase the ratio of engine speed to speed of the wheels and to reduce the BMEP provided by the engine for a given torque delivered by the wheels;
and where, when upspeeding is employed, the engine is operated with a smaller fraction of the fuel being provided by alcohol, a mixture of alcohol and water or water;
and where, for some engine operating conditions, upspeeding is not used in order to obtain a shorter engine response time when engine operation is changed from a lower engine power level to a higher engine power level;
and where the change in the engine power level is obtained by operating for a selected time period at a higher BMEP than would be employed if upspeeded operation were to be used.

11. The vehicle of claim 10, where the selected time period is less than 20 seconds.

12. The vehicle of claim 10, where after the desired higher power level is obtained upspeeding is employed to increase engine RPM and reduce BMEP.

13. The vehicle of claim 10, where the higher BMEP is enabled by the use of more alcohol than would be employed if upspeeding were employed.

14. The vehicle of claim 10, where electric power is used to increase BMEP by utilization of a starter motor that provides power that rotates the crankshaft.

15. The vehicle of claim 14, where the electrical power is provided by an ultra capacitor.

* * * * *